United States Patent Office 3,125,586
Patented Mar. 17, 1964

3,125,586
QUATERNARY AMMONIUM SALTS OF 2-AMINO-ALKOXY SUBSTITUTED ANTHRAQUINONES
Leon Katz, Springfield, and Melvin N. Turetzky, East Brunswick, N.J., assignors to General Aniline & Film Corporation, New York, N.Y., a corporation of Delaware
No Drawing. Filed Jan. 8, 1960, Ser. No. 1,183
9 Claims. (Cl. 260—377)

The present invention relates to certain basic anthraquinone dyestuffs and to a method for producing the same.

An important object of this invention is the provision of novel anthraquinone dyestuffs which are particularly suitable for dyeing synthetic fibers having a basic of polyacrylonitrile in bright, full shades of excellent light fastness.

Another object of this invention is to provide water-soluble anthraquinone dyestuffs which dye synthetic fibers, particularly those having a basis of polyacrylonitrile, directly from an aqueous bath without the aid of conventional dispersing agents.

A further object of this invention is to provide a novel method of preparing the alkali metal salts of the alcohol-amines employed in the process of preparing the anthraquinone dyestuffs of this invention.

Other objects and advantages of this invention will appear from the following detailed description.

The dyestuffs of this invention correspond to the general formula

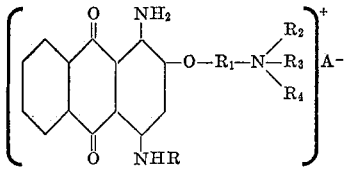

wherein R is alkyl, aryl or cycloalkyl, $R_1$ is an alkyl group of 2 to 6 carbon atoms, $R_2$ and $R_3$ are each alkyl groups of 1 to 3 carbon atoms or a cycloalkyl group joined through a C, O or N to the quaternary nitrogen, and $R_4$ is the quaternizing alkyl group. $A^-$ is an anion, introduced during quaternization, necessary to balance the positive charge on the nitrogen atom of the quaternary amino group.

The cycloalkyl group of $R_2$ and $R_3$ is such as is found, for example, in N-2-hydroxyethyl morpholine or N-2-hydroxyethyl piperidine.

New dyestuffs are obtained by carrying out reactions starting with an anthraquinone base corresponding to the general formula

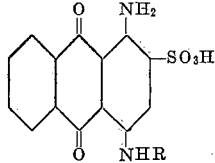

wherein R is alkyl, aryl or cycloalkyl. Examples of suitable starting materials are 1-amino-2-sulfo-4-cyclohexylaminoanthraquinone
1-amino-2-sulfo-4-anilinoanthraquinone
1-amino-2-sulfo-4-(p-acetamidophenyl) aminoanthraquinone
1-amino-2-sulfo-4-(N-methylacetamido) phenylamino-anthraquinone
1-amino-2-sulfo-4-toluidinoanthraquinone
1,4-diamino-2-sulfoanthraquinone
1-amino-2-sulfo-4-ethylmetanilate anthraquinone

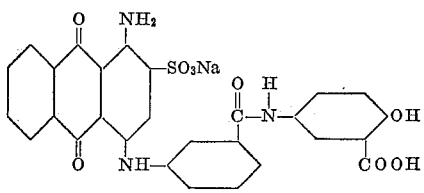

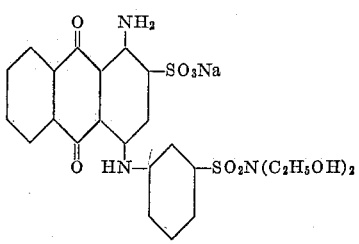

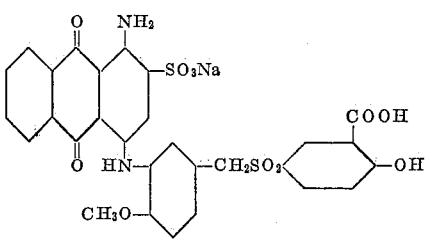

The anthraquinone is reacted with an alkali metal salt of an alcohol-amine corresponding to the formula

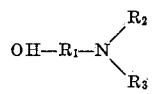

wherein $R_1$, $R_2$ and $R_3$ have the significances hereinbefore set forth. Examples of suitable alcohol-amines are N,N-dimethylethanolamine
N,N-diethylethanolamine
N,N-phenylethylethanolamine
N-(2-hydroxyethyl)piperazine
N-(2-hydroxyethyl)morpholine
N,N,bis(2-ethylhexyl)ethanolamine
N,N-dimethylisopropanolamine Heretofore, alkali metal salts of alcohol-amines were prepared by reacting the alcohol-amines with the alkali metal hydroxide. However, this method suffered from the disadvantage that water formed by this reaction had to be removed, by additional processing, since the water was capable of reacting with the anthraquinone starting material to give undesirable by-products. It has been found that the disadvantages of this prior process may be overcome by converting the alcohol-amines to their alkali metal salts by the use of the alkali metal itself, employing a suitable non-hydroxylic solvent as the reaction medium. Thus, sodium, potassium or lithium metal is reacted with an alcohol-amine in any non-hydroxylic solvent such as hydrocarbons, chlorinated hydrocarbons, ethers, etc., examples of which are Benzene
Monochlorobenzene
Dichlorobenzene
Trichlorobenzene
Ethylene glycol diethyl ether
Diethylene glycol dimethyl ether
Toluene
Xylene
Cyclohexane
Dioxane
Hexane More particularly, the alcohol-amine is added to the solvent with stirring, and then the alkali metal, dispersed in the same solvent, is added.

An important feature of this invention is that the products of the reaction between the above anthraquinone bases and the above alcohol-amines may be readily converted to a quaternary ammonium salt. The final products have the structure set out above and are completely soluble in water.

Suitable quaternizing agents for the preparation of the instant dyestuffs comprise lower alkyl halides such as methyl, ethyl and propyl chlorides, bromides and iodides, and alkyl esters of strong acids such as dimethyl sulfate, ethyl-p-toluenesulfonate and the like.

The dyestuffs of the present invention dye synthetic fibers directly from an aqueous bath even without the aid of dispersing agents used in conventional procedure. While the dyestuffs of the invention build up to bright full shades of excellent light fastness on polyacrylonitrile and modified acrylic fibers, they also yield good tinctorial results on other synthetic fibers such as polyester and polyamide fibers.

More specifically the reaction between the anthraquinone base and the amine is effected at reflux temperature for from 1 to 8 hours, after which the quaternizing agent is passed into the reaction mixture until quaternization is complete. The reaction mixture may again be subjected to reflux temperature, if necessary.

The invention is illustrated but not limited by the following examples in which the parts are by weight.

*Example 1*

2.0 parts of N,N-dimethylethanolamine are added to 30.0 parts of toluene and stirred well. Then 1.3 parts of a 50% sodium in toluene dispersion are added. When the evolution of hydrogen ceases 4.0 parts of the sodium salt of 1-amino-2-sulfo-4-cyclohexylaminoanthraquinone are added and the reaction mixture heated at 80° C. for three hours. The product is isolated by drowning the reaction mixture into water, filtering and washing with warm water until the washings are colorless. The yield, after drying, is 2.5 parts of dye.

After drying 75 parts of the product are dissolved in 1000 parts of benzene and methyl bromide gas is passed in until precipitation of the quaternary is complete. The product is filtered, washed with warm benzene and then dried.

This product is water-soluble and the water solution will dye polyacrylonitrile fibers a brilliant violet shade of excellent build-up and light fastness.

*Example 2*

4.0 parts of N,N-dimethylethanolamine are added to 40 parts of the dimethylether of ethylene glycol and followed by 2.6 parts of a 50% dispersion of sodium in toluene. 8.0 parts of 1-amino-2-sulfo-4-anilinoanthraquinone are added and the reaction completed by refluxing for one hour. The reaction product is isolated and then quaternized as in Example 1.

The product is a crystalline solid, very soluble in water, which solution dyes polyacrylonitrile fibers a bright violet.

*Example 3*

40 parts of ethyleneglycol dimethylether are added to 2.4 parts of N,N-dimethylisopropanolamine and to this mixture is added 2.6 parts of a 50% dispersion of sodium in toluene. Then 8.0 parts of 1-amino-2-sulfo-4-anilinoanthraquinone are added and the mixture is heated to reflux and held eight hours.

The reaction product is then quaternized by adding 4.0 parts of dimethyl sulfate and continuing the reaction for 1 hour. The reaction mass is then evaporated to dryness and extracted with hot benzene to remove any untreated starting material.

The product is a water-soluble dyestuff which dyes acrylonitrile fibers a bright violet from an aqueous bath.

*Example 4*

40 parts of 1,4-dioxane are added to 4 parts of N,N-diethylethanolamine and to this mixture is added 2.6 parts of 50% sodium dispersion in toluene. Then 8.0 parts of 1-amino-2-sulfo-4-(p-acetamidophenyl) aminoanthraquinone are added and the mixture is heated at reflux for one hour. The reaction mixture is drowned into 400 parts of cold water and then filtered and washed with water until the washings are colorless. After drying 5.5 parts of product are isolated. This product may be quaternized as described in Examples 1 and 3.

The product is a dark solid which dyes polyacrylonitrile fibres bright violet shades from an aqueous bath.

*Example 5*

40 parts of ethylene glycol diethylether are added to 4.0 parts of N,N-dimethylethanolamine, and to this mixture is added 2.6 parts of 50% sodium dispersed in toluene. Then 8.0 parts of 1-amino-2-sulfo-4-(N-methylacetamido) phenylaminoanthraquinone are added and the mixture is heated at reflux for one hour. The reaction mixture is drowned into 400 parts of cold water and then filtered and washed with water until the washings are colorless. After drying 5.5 parts of product are isolated.

After drying the product is quaternized as described in Example 1 or Example 3.

The product is a dark solid which dyes polyacrylonitrile fibers bright violet shades from an aqueous bath.

It will be understood, of course, from the naming of the compounds indicated in the application that the symbols

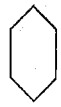

and

as employed in the structural formulas set forth in the specification and claims are intended to signify benzene nuclei and cyclohexane nuclei, respectfully.

We claim:

1. Anthraquinone compounds of the structure

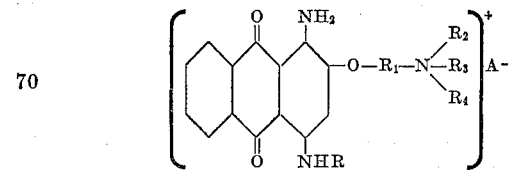

where R is a radical selected from the group consisting of alkyl, hydrogen, cyclohexyl, phenyl, p-acetamidophenyl, (N-methylacetamido) phenyl, tolyl,

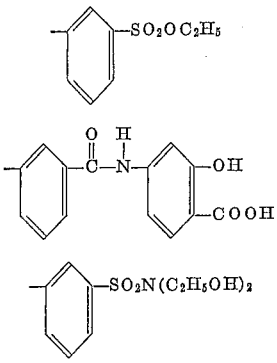

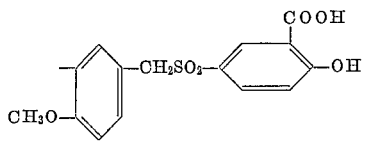

and

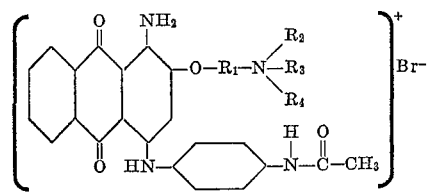

$R_1$ represents an alkylene group of 2 to 6 carbon atoms and $R_2$ and $R_3$ are each a radical selected from the group consisting of an alkyl of from 1 to 3 carbon atoms each and phenyl, and together with the nitrogen atom to which they are attached form a member selected from the group consisting of morpholino and piperidino, $R_4$ is a radical selected from the group consisting of alkyl and ethyl p-tolyl and $A^-$ is an anion selected from the group consisting of sulfonate and inorganic chloride, bromide, iodide and sulfate.

2. The anthraquinone compound of the structure

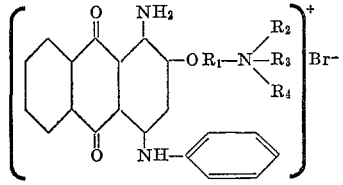

where $R_1$ represents an alkylene group of 2 to 6 carbon atoms and each $R_2$, $R_3$, and $R_4$ is alkyl of from 1 to 3 carbon atoms.

3. The anthraquinone compound of the structure

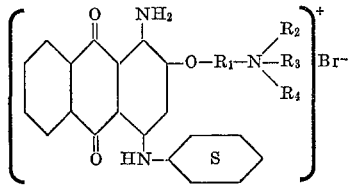

where $R_1$ represents an alkylene group of 2 to 6 carbon atoms and each $R_2$, $R_3$, and $R_4$ is alkyl of from 1 to 3 carbon atoms.

4. The anthraquinone compounds of the following structure

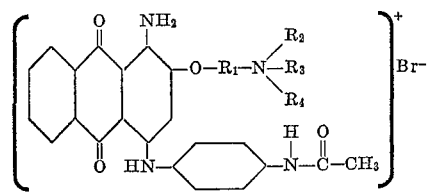

where $R_1$ represents an alkylene group of 2 to 6 carbon atoms and each $R_2$, $R_3$, and $R_4$ is alkyl of from 1 to 3 carbon atoms.

5. The anthraquinone compounds of the structure

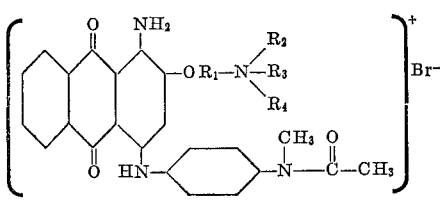

where $R_1$ represents an alkylene group of 2 to 6 carbon atoms and each $R_2$, $R_3$, and $R_4$ is alkyl of from 1 to 3 carbon atoms.

6. The anthraquinone compounds of the structure:

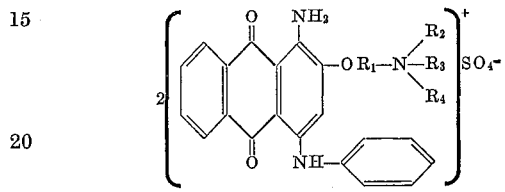

wherein $R_1$ represents an alkylene group of 2 to 6 carbon atoms, and each $R_2$, $R_3$, and $R_4$ is alkyl of from 1 to 3 carbon atoms.

7. The anthraquinone compounds of the structure:

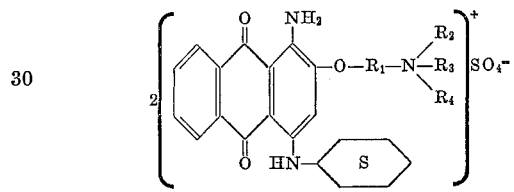

wherein $R_1$ represents an alkylene group of 2 to 6 carbon atoms, and each $R_2$, $R_3$ and $R_4$ is alkyl of from 1 to 3 carbon atoms.

8. The anthraquinone compounds of the structure:

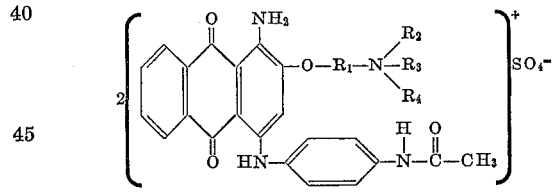

wherein $R_1$ represents an alkylene group of 2 to 6 carbon atoms, and each $R_2$, $R_3$ and $R_4$ is alkyl of from 1 to 3 carbon atoms.

9. The anthraquinone compounds of the structure:

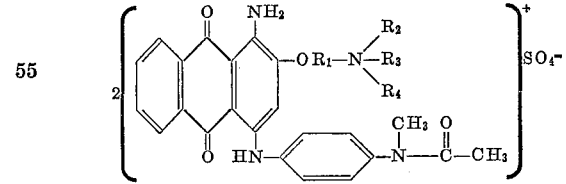

wherein $R_1$ represents an alkylene group of 2 to 6 carbon atoms, and each $R_2$, $R_3$, and $R_4$ is alkyl of from 1 to 3 carbon atoms.

References Cited in the file of this patent

UNITED STATES PATENTS

| | | |
|---|---|---|
| 1,881,752 | Lodge et al. | Oct. 11, 1932 |
| 2,117,569 | Peter | May 17, 1938 |
| 2,580,190 | Peter | Dec. 25, 1951 |

FOREIGN PATENTS

| | | |
|---|---|---|
| 1,163,682 | France | Apr. 28, 1958 |